United States Patent [19]

Ochiai

[11] Patent Number: 4,878,526
[45] Date of Patent: Nov. 7, 1989

[54] RADIAL TIRE TREAD HAVING INCLINED AND AXIAL SIPES

[75] Inventor: Kiyoshi Ochiai, Kobe, Japan

[73] Assignee: Sumitomo Rubber Industries, Ltd., Hyogo, Japan

[21] Appl. No.: 166,259

[22] Filed: Mar. 10, 1988

[30] Foreign Application Priority Data

Mar. 10, 1987 [JP] Japan ................................. 62-56145

[51] Int. Cl.⁴ ............................................. B60C 11/12
[52] U.S. Cl. ............................ 152/209 R; 152/DIG. 3
[58] Field of Search .......... 152/209 R, 209 D, 209 A, 152/209 B, DIG. 3

[56] References Cited

U.S. PATENT DOCUMENTS

| D. 114,954 | 5/1939 | Kraft | 152/209 D |
| 2,094,636 | 10/1937 | Bull | 152/209 R |
| 2,926,715 | 3/1960 | Constantakis | 152/209 R |

FOREIGN PATENT DOCUMENTS

| 61008 | 4/1983 | Japan | 152/209 R |
| 96002 | 6/1984 | Japan | 152/DIG. 3 |
| 169836 | 9/1984 | Japan | 152/209 D |
| 60010 | 4/1985 | Japan | 152/209 D |
| 2093777 | 9/1982 | United Kingdom | 152/209 D |

Primary Examiner—Michael W. Ball
Assistant Examiner—Geoffrey L. Knable
Attorney, Agent, or Firm—Birch, Stewart, Kolasch & Birch

[57] ABSTRACT

A radial tire having a tread provided with a plurality of circumferential grooves extending circumferentially of the tire to form a rib pattern thereon, said tread having lateral side portions, each having a width of 10 to 35% of the tread width extending from each edge thereof, said side portions being provided with sipes arranged at intervals of 8 to 20 mm in the circumferential direction of the tire, said sipes each comprising a main portion inclined with respect to the axial direction of the tire at an angle of 5 to 25 degrees and an outer portion located axially outward of said main portion and extending axially at an angle of not more than 5 degrees to the axial direction of the tire, the axial length of said outer portion of each sipe being not more than 10% of the tread width and being not more than 50% of the axial length of the sipe.

13 Claims, 6 Drawing Sheets

PRIOR ART

RADIAL TIRE TREAD HAVING INCLINED AND AXIAL SIPES

BACKGROUND OF THE INVENTION

The present invention relates to a pneumatic tire, and more particularly a rib pattern radial ply tire, which is provided in both side portions of the tread with a plurality of sipes to prevent the partial wear of the tread.

In general, a tread part of a radial ply tire is reinforced with a belt layer which comprises plural plies of steel cords arranged at an angle of 15° to 70° with respect to the circumferential ddirection of the tire. Accordingly, the tread part of such radial tire is rigid, and both side portions of the tread becomes smaller in ground pressure than the central portion. As a result, the amount of slip of the tread on the ground becomes larger in the side portions than the central portion, and uneven wear in the tread shoulders, what is called shoulder wear is most liable to happen. This problem is particularly noticeable for heavy duty tires for trucks and buses.

In order to reduce the problems of such uneven wear, it is known in the art to provide plural sipes in the both side portions of the tread lending to lessen the slip of those portions on the ground by means of the lowered apparent rigidity of the tread rubber which makes it possible to stay on the ground.

Such a construction is shown in FIG. 10, in which the sipes (S) are shallow and arranged parallel to the axial direction of the tire, and their lengths SW are less than 5% of the tread width, and further the circumferential grooves which define the side ribs are zigzag. Such sipes (S) are however, so short and shallow that they cannot control the distribution of the ground pressure in the widthwise direction of the tread, that is, they are not effective in preventing the uneven wear.

Also in Japanese Gazette TOKKAI No. 58-162643, as shown in FIG. 11, the sipes are provided on the blocks SB which are defined by a zigzag circumferential groove SG and axial grooves extending therefrom the to tread edge. Essentially such free blocks are liable to move. Therefore the sipes decrease the rigidity still more specifically in the projecting portion of the zigzag edge of the block, and uneven wear so called railway wear is caused in early stage.

It is therefore, an object of the present invention to provide a radial ply tire especially suitable for heavy duty use, in which the problems of uneven wear is reduced by unifying the amount of slip of the tread on the ground in the widthwise direction thereof.

SUMMARY OF THE INVENTION

According to one aspect of the invention the radial tire comprises a tread provided with a plurality of grooves extending circumferentially of the tire to form a rib pattern thereon, the tread provided on its both side portions defined as portions between edges of the tread and boundaries 10 to 35% of the tread width apart therefrom with sipes, the sipes having a depth of 20 to 120% of a depth of the groove and arranged at intervals of 8 to 20 mm in the circumferential direction of the tire and at an angle of 5° to 25° with respect to the axial direction of the tire.

Preferably, the sipes increase in depth gradually towards the respective edges of the tread, and each sipe is provided with a portion parallel to the axial direction of the tire.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

An embodiment of the present invention will now be described, by way of example only, in conjunction with the drawings.

Figure 1:
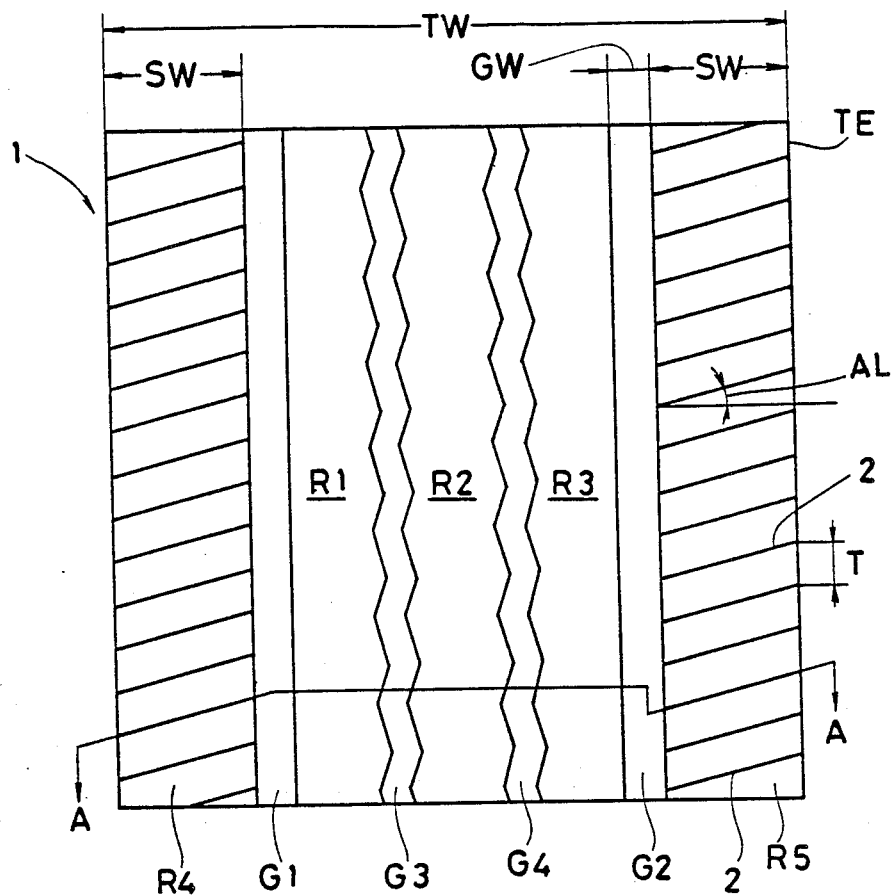
FIG. 1 is a partial view showing a tread of an embodiment of the present invention.
Figure 2:
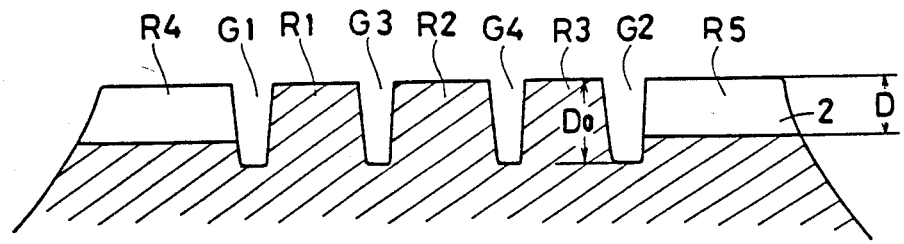
FIG. 2 is a sectional view taken along the line A—A of FIG. 1.

In the FIGS. 1 and 2, the tread 1 is provided with a pair of straight grooves G1 and G2 and a pair of zigzag grooves G3 and G4 arrange therebetween, whereby the tread 1 is divided into two side ribs R4 and R5 and three central ribs R1, R2 and R3 therebetween. The width of each side rib R4 or R5 is in the range of 10 to 35% of the tread width TW, and the parallel sipes 2 are formed on the side ribs so that they extend straight across the side ribs R4 and R5 from the tread edge TE to the straight groove G1 or G2.

In the present invention, the sipe is a thickless cut formed by using a thin blade after a vulcanization of the tire, that is, the sipe has substantially no groove width.

The width GW of the circumferential groove is 5 to 8% of the tread width TW. If the width GW is smaller than 5%, the directional stability of the tire is reduced and wet grip is lowered. If it is more than 8%, the ground contacting area of the tire is reduced and wear resistance becomes worse.

The sipes 2 are provided in both side portions of the tread ranging 10 to 35% of the tread width from the tread edge TE. This means the length SW of the sipe 2 in the axial direction of the tire is 10 to 35% of the tread width TW, whereby the distribution of the ground pressure, that is, the distribution of the amount of slip is evened in the widthwise direction of the tread.

The sipes 2 make the tread rubber in those portions soft as a whole. Accordingly, the rubber can be smoothly bent and pressed on the ground, increasing the ground pressure in the side portions. As the result, the amount of slip, that is, the uneven wear is decreased, and traction and breaking force increase. Also the edges formed by the sipes 2 cut the water screen while running thereby improving the drainage.

If the sipes 2 are shallow, the above-mentioned effects are not expected, while if they are too deep, the rigidity of the tread is reduced and the tread is liable to be torn off and damaged. Accordingly, the depth D of the sipes 2 is 20 to 120% more preferably 60 to 100% of the depth Do of the circumferential groove, wherein if there are different depth grooves in the tread the depth Do is defined by the deepest groove.

The sipes 2 are arranged at an angle AL within a range of 5° to 25° with respect to the axial direction of the tire. If the angle AL is smaller than 5°, the central portion of the side rib R4, R5 is decreased is rigidity, and the wear resistance and strength thereof become worse. On the contrary, if more than 25°, the amount of slip increases, and the advantageous effect of the sipes cannot be expected.

Furthermore, the sipes 2 are arranged at intervals T of 8 to 20 mm in the circumferential direction of the tire. If the interval T is larger than 20 mm, the rigidity of the side rib becomes high, and the amount of slip thereof or uneven wear is not reduced. On the contrary, if it is smaller than 8 mm, the wear resistance and the strength thereof are decreased.

Figure 5:
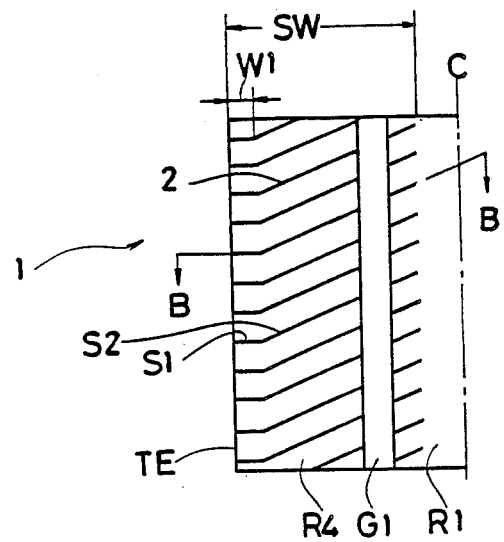
FIG. 5 is a partial view showing a tread of another embodiment of the present invention.

In the FIG. 5 showing a tread of another embodiment of the present invention, the tread 1 is provided with a pair of straight grooves G1 and G2, whereby the tread 1 is divided into two side ribs R4 and R5 (R5 is not shown) and a central rib R1 therebetween. Each sipe 2 extenddsd across the side rib R4 or R5 from the tread edge TE to the central rib R1 beyond the straight groove G1 or G2, whereby a slip of the rib edge on each side of the straight groove is lessened, and as the result the generation of railway wear is effectively suppressed.

Also, each sipe 2 is provided axially outside its main portion 2 with a portion S1 nearly parallel with the axial direction of the tire. As shown in FIG. 5, the main portion S2 is inclined to the axial direction at a larger angle than the portion S1. The length W1 of the portion S1 in the axial direction is not more than 10% of the tread width TW and not more than 50% of the length SW of the sipe 2. Preferably, the angle of the portion S1 to the axial direction of the tire is not more than 5°. For that reason, the slip of the tread edge portions is reduced and also edge-wear is efficiently prevented.

Figure 6:
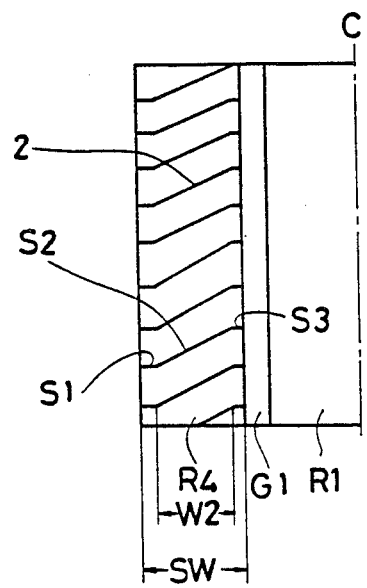
FIG. 6 is a partial view showing a tread of another embodiment of the present invention.

In the FIG. 6 showing a tread of another embodiment of the present invention, the tread 1 is provided with a pair of straight grooves G1 and G2, whereby the tread 1 is divided into two side ribs R4 and R5 (R5 is not shown) and a central rib R1 therebetween. Each sipe 2 extends across the side rib R4 or R5 from tread edge TE to the straight groove G1 or G2. Also, each sipe 2 is provided axially outside and inside its main portion S2 with a portion S1 and a portion S3 nearly parallel to the axial direction of the tire. As shown in FIG. 6, the main portion S2 is inclined to the axial direction at a larger angle than the portions S1 and S3. The length W2 of the portion S2 in the axial direction is not less than 50% of the length SW of the sipe 2.

In the embodiments shown in the FIG. 5 or 6 which shows the left half of the tread thereof, the right half can be formed either in a line symmetry with respect to the center line C, or in a point symmetry.

Figure 7:
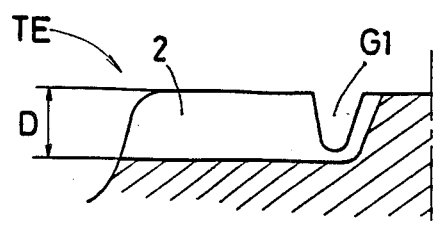
FIGS. 7 to 9 are sectional views taken along the line B—B of FIG. 5 and showing modifications of the sipe.
Figure 8:
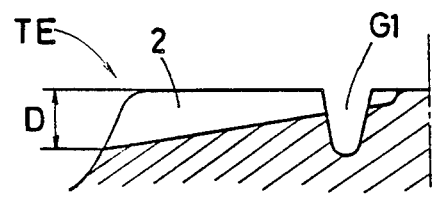
Figure 9:
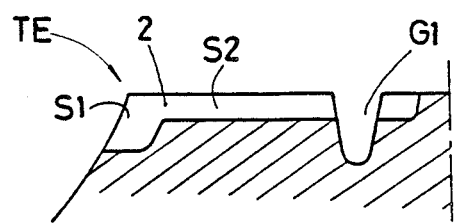
Figure 10:
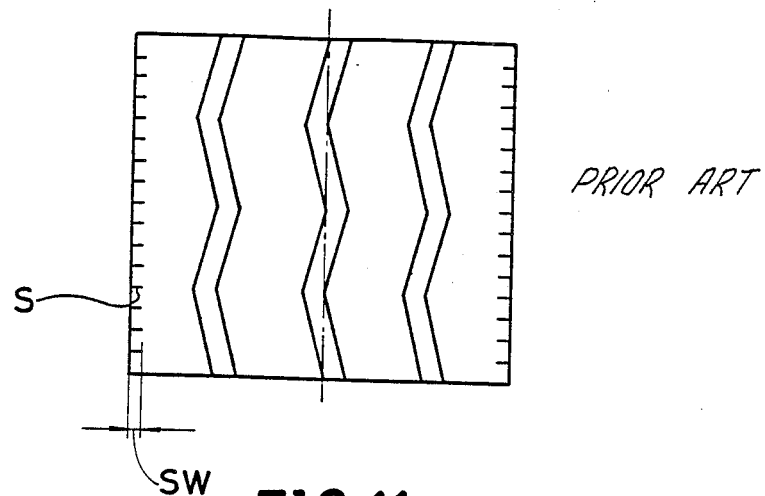
FIGS. 10 and 11 are partial views showing tires according to the prior art.
Figure 11:
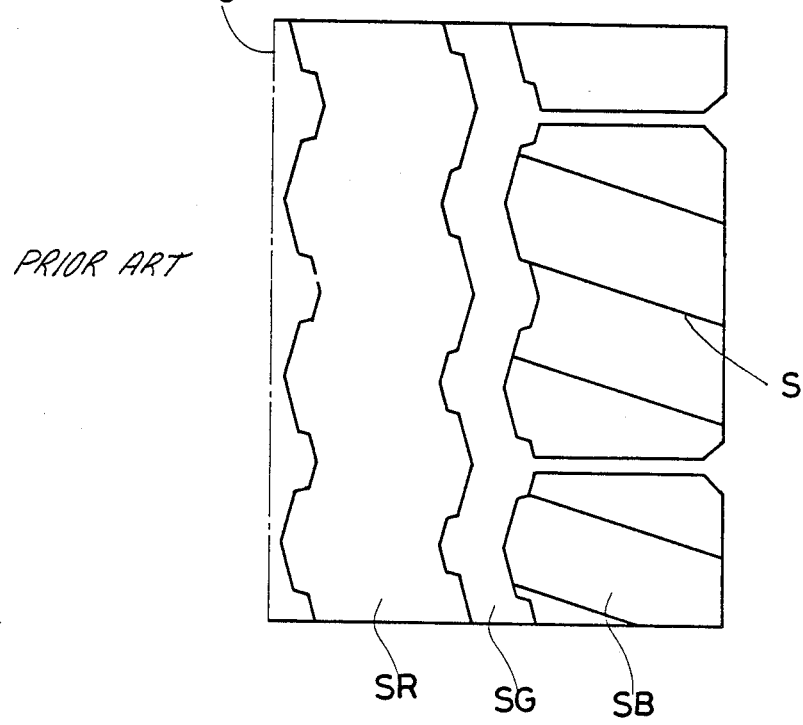

For the control of the ground pressure distribution in the widthwise direction of the tread it is also effective to vary the depth of the sipes. FIGS. 2, 7, 8 and 9 show the modifications of the sipe in the present invention. FIG. 2 shows a sectional view taken along the line A—A of FIG. 1, and the FIGS. 7, 8 and 9 show the sectional view taken along the line B—B of the FIG. 5 and the modifications of the sipe therein. In the FIG. 2 the depth D of the sipe 2 is constant and less than the depth Do of the groove G1. In the FIG. 7 the depth D of the sipe 2 is constant and more than the depth Do of the groove G1. In the FIG. 8 the depth D increases gradually toward the tread end TE from its inner end. In the FIG. 9 the axially outer portion S1 of the sipe 2 is deeper than the main portion S2. Such modifications can be applied to the sipe in the FIG. 1 or 6.

Such plural kinds of sipes with different length and/or depth are combineable into one tread.

The inventor made, by way of trial, 10.00R20 steel radial tires for truck and bus of which the specifications are set in Table 1. These tires were mounted on front wheels of a vehicle and, the uneven wear of the shoulder parts of the tires were measured after a 30,000 km run. As for resistance to wear and wet braking characteristics, some tires underwent comparison tests, the results of which are shown in Table 1 with relative value.

TABLE 1

| Ex. No. | Tread Pattern (Fig. No.) | SW/TW (%) | D/Do (%) | AL (°) | Thickness of Sipe (mm) | T (mm) | GW/TW (%) | Shoulder Wear[4] | Railway Wear (Yes or No) | Wear Resistance[5] | Wet Grip[5] | Edge wear Resistance[5] |
|---|---|---|---|---|---|---|---|---|---|---|---|---|
| Embodiments ||||||||||||||
| 1 | 1 | 25 | 75 | 20 | 0.2 | 15 | 7.3 | 50 | N | 100 | 100 | 100 |
| 2 | 1 | 25 | 50 | 20 | 0.2 | 15 | 7.3 | 55 | N | | | |
| 3 | 1 | 25 | 100 | 20 | 0.2 | 15 | 7.3 | 50 | N | | | |
| 4 | 1 | 25 | 75 | 5 | 0.2 | 15 | 7.3 | 50 | N | | | |
| 5 | 1 | 25 | 75 | 25 | 0.2 | 15 | 7.3 | 50 | N | | | |
| 6 | 1 | 25 | 75 | 20 | 0.2 | 8 | 4 | 50 | N | 107 | 90 | |
| 7 | 1 | 25 | 75 | 20 | 0.2 | 8 | 9 | 50 | N | 90 | | |
| 8 | 5 & 7 | 25 | 110 | 20 & 0 | 0.2 | 15 | 7.3 | 50 | N | 100 | 105 | 110 |
| 9 | 5 & 9 | 25 | 75 & 40 | 20 & 0 | 0.2 | 15 | 7.3 | 50 | N | 105 | 105 | 110 |
| Comparative Ex. ||||||||||||||
| 1 | 11 | 20–25 | 75 | 20 | 0.2 | 15 | 6.7 | 55 | Y | | | |
| 2 | 10 | 5 | 75 | 0 | 0.2 | 15 | 6.3 | 80 | N | | | |
| 3 | 1 | 25 | 10 | 20 | 0.2 | 15 | 7.3 | 85 | N | | | |
| 4 | 1 | 25 | 130 | 20 | 0.2 | 15 | 7.3 | *1 | N | | | |
| 5 | 1 | 25 | 75 | 3 | 0.2 | 15 | 7.3 | *2 | N | | | |
| 6 | 1 | 25 | 75 | 30 | 0.2 | 15 | 7.3 | 90 | N | | | |
| 7 | 1 | 75 | — | — | — | — | 7.3 | 100 | N | | | |
| 8 | 1 | 25 | 75 | 20 | 0.5 | 15 | — | *3 | N | | | |
| 9 | 1 | 75 | 75 | 20 | 0.2 | 5 | 7.3 | *1 | N | | | |

TABLE 1-continued

| Ex. No. | Tread Pattern (Fig. No.) | SW/TW (%) | D/Do (%) | AL (°) | Thickness of Sipe (mm) | T (mm) | GW/TW (%) | Shoulder Wear*4 | Railway Wear (Yes or No) | Wear Resistance*5 | Wet Grip*5 | Edge wear Resistance*5 |
|---|---|---|---|---|---|---|---|---|---|---|---|---|
| 10 | 1 | 75 | 75 | 20 | 0.2 | 25 | 7.3 | 80 | N | | | |

Figure 3:
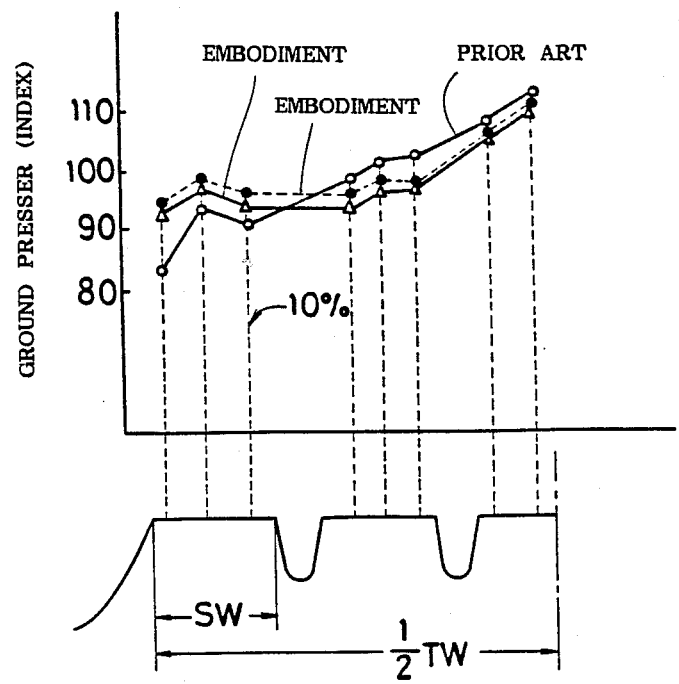
FIG. 3 is a graph showing the distribution of the ground pressure in the widthwise direction of the tread.
Figure 4:
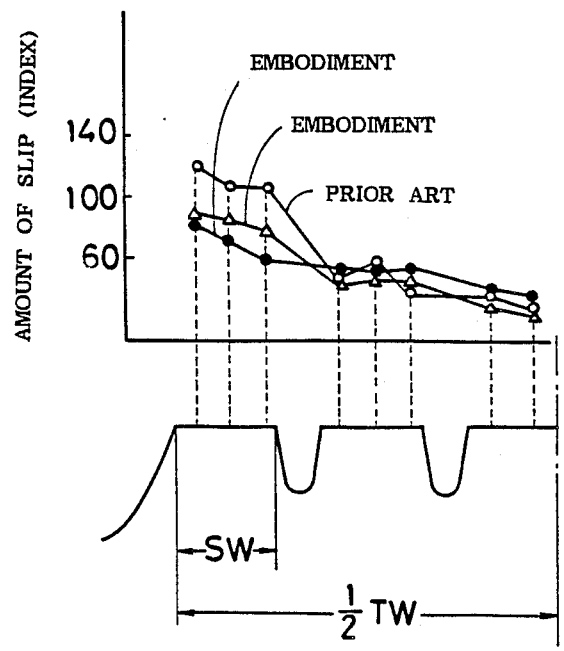
FIG. 4 is a graph showing the distribution of the amount of slip in the widthwise direction of the tread.

*1, *2 tread was damaged in the test
*3 uneven wear took place in both sides of the sipe with respect to the circumferential direction
*4 the smaller the index, the better the performance
*5 the larger the index, the better the performance Further, as for the ground pressure distribution and the slip amount distribution in the widthwise direction of the tread, the embodiment tires 1 and 5 and comparative example tire 7 were measured, and the measurements are shown in the FIGS. 3 and 4, respectively. The FIG. 3 shows the ground pressure of the comparative example tire 7, corresponding to a conventional five rib pattern tire, is smaller than those of the embodiment tires 1 and 5 ithe range of 35%, especially 10% of the tread width TW from the tread edge. It is appaarent from FIGS. 3 and 4 that the tires according to the present invention were improved in uniformity of both ground pressure distribution and the slip amount distribution.

As mentioned above, to even the ground pressure distribution in the widthwise direction of the tread, the present invention optimize the sipes of the rib pattern tire in depth, intervals, angle at which the sipes are arranged, and range in which the sipes are provided. Accordingly, in the present invention the amount of slip is decreased in the shoulder parts, and uneven wear can be effectively prevented. By the way, the circumferential grooves which define the side ribs are straight, whereby the rigidity of the side rib is unified and the railway wear is effectively prevented.

I claim:

1. A radial tire having a tread provided with a plurality of circumferential grooves extending circumferentially of the tire to form a rib pattern thereon,
   said tread having lateral side portions, each said side portion being provided with sipes arranged at intervals of 8 to 20 mm in the circumferential direction of the tire, each said sipe having a length in the axial direction of the tire which is 10 to 35% of the tread width, said sipes each comprising
   a main portion inclined with respect to the axial direction of the tire at an angle of 5 to 25 degrees and
   an outer portion located axially outward of said main portion and extending axially to the tread edge at an angle of not more than 5 degrees to the axial direction of the tire, wherein the main portion is inclined to the axial direction of the tire at a larger angle than said outer portion,
   the axial length of said outer portion of each sipe being not more than 10% of the tread width and being not more than 50% of the axial length of the sipe.

2. The radial tire as set forth in claim 1, wherein the axially outer portion of each sipe is deeper than the main portion.

3. The radial tire as set forth in claim 1, wherein the depth of each sipe is constant and deeper than the depth of the circumferential grooves.

4. The radial tire as set forth in claim 1, wherein the width of each circumferential groove is 5 to 8% of the tread width.

5. A radial tire having a tread provided with a plurality of circumferential grooves extending circumferentially of the tire to form a rib pattern thereon,
   said tread having lateral side portions, each said side portion being provided with sipes arranged at intervals of 8 to 22 mm in the circumferential direction of the tire, each said sipe having a length in the axial direction of the tire which is 10 to 35% of the tread width,
   said sipes each comprising
   a main portion inclined with respect to he axial direction of the tire at an angle of 5 to 25 degrees, 6. The radial tire as set forth in claim 5, wherein the axially outer portion of each sipe is deeper than the main portion.

7. The radial tire as set forth in claim 5, wherein the depth of each sipe is constant and more than the depth of the circumferential grooves.

8. The radial tire as set forth in claim 5, wherein the width of each circumferential groove is 5 to 8% of the tread width.

9. The radial tire as set forth in claim 1, wherein said sipes increse in depth gradually towards the respective edges of the tread.

10. The radial tire as set forth in claim 5, wherein said sipes increse in depth gradually towards the respective edges of the tread.

11. The radial tire as set forth in claim 1, wherein the depth of each sipe is constant and less than the depth of the circumferential grooves.

12. The radial tire as set forth in claim 5, wherein the depth of each sipe is constant and less than the depth of the circumferential grooves.

13. The radial tire of claim 1, wherein the main portion of each sipe extends axially inwardly beyond he circumferential groove closest to the respective tread edge.

* * * * *